(12) United States Patent
Cho

(10) Patent No.: US 7,298,292 B2
(45) Date of Patent: Nov. 20, 2007

(54) METHOD AND APPARATUS FOR GENERATING CHARACTER SET

(75) Inventor: Joong-won Cho, Seoul (KR)

(73) Assignee: Pantech Co., Ltd. (KR)

( * ) Notice: Subject to any disclaimer, the term of this patent is extended or adjusted under 35 U.S.C. 154(b) by 0 days.

(21) Appl. No.: 11/492,287

(22) Filed: Jul. 24, 2006

(65) Prior Publication Data

US 2007/0018862 A1 Jan. 25, 2007

(30) Foreign Application Priority Data

Jul. 25, 2005 (KR) ............... 10-2005-0067524

(51) Int. Cl.
*H03M 7/00* (2006.01)
*G06F 15/16* (2006.01)

(52) U.S. Cl. ................... 341/50; 709/219

(58) Field of Classification Search ........... 341/50, 341/90, 106; 715/542; 709/219, 203, 217; 704/2, 9, 8
See application file for complete search history.

(56) References Cited

U.S. PATENT DOCUMENTS 5,682,158 A * 10/1997 Edberg et al. ............. 341/90
6,247,048 B1 * 6/2001 Greer et al. ............... 709/219
6,601,168 B1 * 7/2003 Stancil et al. ............. 713/100
6,766,296 B1 * 7/2004 Adachi ..................... 704/246
7,132,962 B1 * 11/2006 Degenhardt et al. ......... 341/50
7,218,252 B2 * 5/2007 Fauque .................... 341/50

* cited by examiner

*Primary Examiner*—Peguy JeanPierre
(74) *Attorney, Agent, or Firm*—Blakely, Sokoloff, Taylor & Zafman

(57) ABSTRACT

A method of generating a character set is provided, including: receiving two bytes of a character code value and determining whether or not the character code value is greater than a predetermined reference value; adding a predetermined offset value to the character code value and outputting the resultant value if the character code value is greater than the predetermined reference value, and outputting the character code value if the character code value is not greater than the predetermined reference value; and adding null data to the end of a character string consisting of the character code value after the character code value is input.

8 Claims, 5 Drawing Sheets

FIG.2A

| Ctrl | Dec | Hex | Char | Code | Dec | Hex | Char | Dec | Hex | Char | Dec | Hex | Char |
|---|---|---|---|---|---|---|---|---|---|---|---|---|---|
| ^@ | 0 | 00 | | NUL | 32 | 20 | | 64 | 40 | @ | 96 | 60 | ` |
| ^A | 1 | 01 | | SOH | 33 | 21 | ! | 65 | 41 | A | 97 | 61 | a |
| ^B | 2 | 02 | | STX | 34 | 22 | " | 66 | 42 | B | 98 | 62 | b |
| ^C | 3 | 03 | | ETX | 35 | 23 | # | 67 | 43 | C | 99 | 63 | c |
| ^D | 4 | 04 | | EOT | 36 | 24 | $ | 68 | 44 | D | 100 | 64 | d |
| ^E | 5 | 05 | | ENQ | 37 | 25 | % | 69 | 45 | E | 101 | 65 | e |
| ^F | 6 | 06 | | ACK | 38 | 26 | & | 70 | 46 | F | 102 | 66 | f |
| ^G | 7 | 07 | | BEL | 39 | 27 | ' | 71 | 47 | G | 103 | 67 | g |
| ^H | 8 | 08 | | BS | 40 | 28 | ( | 72 | 48 | H | 104 | 68 | h |
| ^I | 9 | 09 | | HT | 41 | 29 | ) | 73 | 49 | I | 105 | 69 | i |
| ^J | 10 | 0A | | LF | 42 | 2A | * | 74 | 4A | J | 106 | 6A | j |
| ^K | 11 | 0B | | VT | 43 | 2B | + | 75 | 4B | K | 107 | 6B | k |
| ^L | 12 | 0C | | FF | 44 | 2C | , | 76 | 4C | L | 108 | 6C | l |
| ^M | 13 | 0D | | CR | 45 | 2D | - | 77 | 4D | M | 109 | 6D | m |
| ^N | 14 | 0E | | SO | 46 | 2E | . | 78 | 4E | N | 110 | 6E | n |
| ^O | 15 | 0F | | SI | 47 | 2F | / | 79 | 4F | O | 111 | 6F | o |
| ^P | 16 | 10 | | DLE | 48 | 30 | 0 | 80 | 50 | P | 112 | 70 | p |
| ^Q | 17 | 11 | | DC1 | 49 | 31 | 1 | 81 | 51 | Q | 113 | 71 | q |
| ^R | 18 | 12 | | DC2 | 50 | 32 | 2 | 82 | 52 | R | 114 | 72 | r |
| ^S | 19 | 13 | | DC3 | 51 | 33 | 3 | 83 | 53 | S | 115 | 73 | s |
| ^T | 20 | 14 | | DC4 | 52 | 34 | 4 | 84 | 54 | T | 116 | 74 | t |
| ^U | 21 | 15 | | NAK | 53 | 35 | 5 | 85 | 55 | U | 117 | 75 | u |
| ^V | 22 | 16 | | SYN | 54 | 36 | 6 | 86 | 56 | V | 118 | 76 | v |
| ^W | 23 | 17 | | ETB | 55 | 37 | 7 | 87 | 57 | W | 119 | 77 | w |
| ^X | 24 | 18 | | CAN | 56 | 38 | 8 | 88 | 58 | X | 120 | 78 | x |
| ^Y | 25 | 19 | | EM | 57 | 39 | 9 | 89 | 59 | Y | 121 | 79 | y |
| ^Z | 26 | 1A | | SUB | 58 | 3A | : | 90 | 5A | Z | 122 | 7A | z |
| ^[ | 27 | 1B | | ESC | 59 | 3B | ; | 91 | 5B | [ | 123 | 7B | { |
| ^\ | 28 | 1C | | FS | 60 | 3C | < | 92 | 5C | \ | 124 | 7C | \| |
| ^] | 29 | 1D | | GS | 61 | 3D | = | 93 | 5D | ] | 125 | 7D | } |
| ^^ | 30 | 1E | ▲ | RS | 62 | 3E | > | 94 | 5E | ^ | 126 | 7E | ~ |
| ^_ | 31 | 1F | ▼ | US | 63 | 3F | ? | 95 | 5F | _ | 127 | 7F | ⌂ |

FIG.2B

| Dec | Hex | Char | Dec | Hex | Char | Dec | Hex | Char | Dec | Hex | Char |
|---|---|---|---|---|---|---|---|---|---|---|---|
| 128 | 80 | Ç | 160 | A0 | á | 192 | C0 | L | 224 | E0 | α |
| 129 | 81 | ü | 161 | A1 | í | 193 | C1 | ⊥ | 225 | E1 | β |
| 130 | 82 | é | 162 | A2 | ó | 194 | C2 | ┬ | 226 | E2 | Γ |
| 131 | 83 | â | 163 | A3 | ú | 195 | C3 | ├ | 227 | E3 | π |
| 132 | 84 | ä | 164 | A4 | ñ | 196 | C4 | ─ | 228 | E4 | Σ |
| 133 | 85 | à | 165 | A5 | Ñ | 197 | C5 | ┼ | 229 | E5 | σ |
| 134 | 86 | å | 166 | A6 | ª | 198 | C6 | ╞ | 230 | E6 | μ |
| 135 | 87 | ç | 167 | A7 | º | 199 | C7 | ╟ | 231 | E7 | τ |
| 136 | 88 | ê | 168 | A8 | ¿ | 200 | C8 | ╚ | 232 | E8 | Φ |
| 137 | 89 | ë | 169 | A9 | ⌐ | 201 | C9 | ╔ | 233 | E9 | Θ |
| 138 | 8A | è | 170 | AA | ¬ | 202 | CA | ╩ | 234 | EA | Ω |
| 139 | 8B | ï | 171 | AB | ½ | 203 | CB | ╦ | 235 | EB | δ |
| 140 | 8C | î | 172 | AC | ¼ | 204 | CC | ╠ | 236 | EC | ∞ |
| 141 | 8D | ì | 173 | AD | ¡ | 205 | CD | ═ | 237 | ED | φ |
| 142 | 8E | Ä | 174 | AE | « | 206 | CE | ╬ | 238 | EE | ε |
| 143 | 8F | Å | 175 | AF | » | 207 | CF | ╧ | 239 | EF | ∩ |
| 144 | 90 | É | 176 | B0 | ░ | 208 | D0 | ╨ | 240 | F0 | ≡ |
| 145 | 91 | æ | 177 | B1 | ▒ | 209 | D1 | ╤ | 241 | F1 | ± |
| 146 | 92 | Æ | 178 | B2 | ▓ | 210 | D2 | ╥ | 242 | F2 | ≥ |
| 147 | 93 | ô | 179 | B3 | │ | 211 | D3 | ╙ | 243 | F3 | ≤ |
| 148 | 94 | ö | 180 | B4 | ┤ | 212 | D4 | ╘ | 244 | F4 | ⌠ |
| 149 | 95 | ò | 181 | B5 | ╡ | 213 | D5 | ╒ | 245 | F5 | ⌡ |
| 150 | 96 | û | 182 | B6 | ╢ | 214 | D6 | ╓ | 246 | F6 | ÷ |
| 151 | 97 | ù | 183 | B7 | ╖ | 215 | D7 | ╫ | 247 | F7 | ≈ |
| 152 | 98 | ÿ | 184 | B8 | ╕ | 216 | D8 | ╪ | 248 | F8 | ° |
| 153 | 99 | Ö | 185 | B9 | ╣ | 217 | D9 | ┘ | 249 | F9 | ∙ |
| 154 | 9A | Ü | 186 | BA | ║ | 218 | DA | ┌ | 250 | FA | · |
| 155 | 9B | ¢ | 187 | BB | ╗ | 219 | DB | █ | 251 | FB | √ |
| 156 | 9C | £ | 188 | BC | ╝ | 220 | DC | ▄ | 252 | FC | ⁿ |
| 157 | 9D | ¥ | 189 | BD | ╜ | 221 | DD | ▌ | 253 | FD | ² |
| 158 | 9E | ₧ | 190 | BE | ╛ | 222 | DE | ▐ | 254 | FE | ■ |
| 159 | 9F | ƒ | 191 | BF | ┐ | 223 | DF | ▀ | 255 | FF |   |

FIG.3

| | |
|---|---|
| 0000...007F | BASIC LATIN |
| 0080...00FF | LATIN-1 SUPPLEMENT |
| 0100...017F | LATIN EXTENDED-A |
| 0180...024F | LATIN EXTENDED-B |
| 0250...02AF | IPA EXTENSIONS |
| 02B0...02FF | SPACING MODIFIER LETTERS |
| 0300...036F | COMBINING DIACRITICAL MARKS |
| 0370...03FF | GREEK |
| 0400...04FF | CYRILLIC |
| 0530...058F | ARMENIAN |
| 0590...05FF | HEBREW |
| ... | |

METHOD AND APPARATUS FOR GENERATING CHARACTER SET

BACKGROUND OF THE INVENTION

This application claims the priority of Korean Patent Application No. 2005-67524, filed on Jul. 25, 2005, in the Korean Intellectual Property Office, the disclosure of which is incorporated herein in its entirety by reference.

FIELD OF THE INVENTION

The present invention relates to a method and apparatus for generating a character set by using a modified Unicode character set.

DESCRIPTION OF RELATED ART

In general, character sets required for inputting characters, such as numerals, symbols, Korean characters, and Japanese characters, are used in mobile communication terminals, and code values of each of the character sets are assigned to the characters. Examples of a method of encoding the character set include a single-byte character set (SBCS), a multi-byte character set (MBCS), and a Unicode character set. The respective character sets are different from one another in terms of the number of bytes used for representing a character and null data added at the end of a character string.

SBCS uses less memory than MBCS or Unicode character set to represent characters but has a limitation in representing various types of characters. MBCS uses a plurality of bytes to represent a character even though the character can be represented with one byte.

SUMMARY OF THE INVENTION

The present invention provides a method and apparatus for generating a character set, which reduces a memory required for representing a character by varying the number of bytes required for representing the character.

According to an aspect of the present invention, there is provided a method of generating a character set, including: receiving two bytes of a character code value and determining whether or not the character code value is greater than a predetermined reference value; adding a predetermined offset value to the character code value and outputting the resultant value if the character code value is greater than the predetermined reference value, and outputting the character code value if the character code value is not greater than the predetermined reference value; and adding null data to the end of a character string consisting of the character code value after the character code value is input.

According to another aspect of the present invention, there is provided an apparatus for generating a character set, including: a determination part receiving two bytes of a character code value and determining whether or not the character code value is greater than a predetermined reference value; a conversion part adding a predetermined offset value to the character code value and outputting the resultant value if the character code value is greater than the predetermined reference value; and an output part adding null data to the end of a character string consisting of the character code value after the character code value is input and outputting the character string.

The apparatus may further include a character processing part processing and displaying the character string.

The character code value may be a Unicode value, and the predetermined reference value may be '0x 0080'.

The offset value may be '0x 8000', and the null data may be '0x 00'.

According to another aspect of the present invention, there is provided a computer readable medium recording a program executing in a computer the method of generating a character set.

BRIEF DESCRIPTION OF THE DRAWINGS

The above and other features and advantages of the present invention will become more apparent by describing in detail exemplary embodiments thereof with reference to the attached drawings in which:

FIGS. 2A and 2B illustrate ASCII code tables;

FIG. 3 illustrates part of a Unicode character set; and

DETAILED DESCRIPTION OF THE INVENTION

Exemplary embodiments in accordance with the present invention will now be described in detail with reference to the accompanying drawings.

Figure 1:
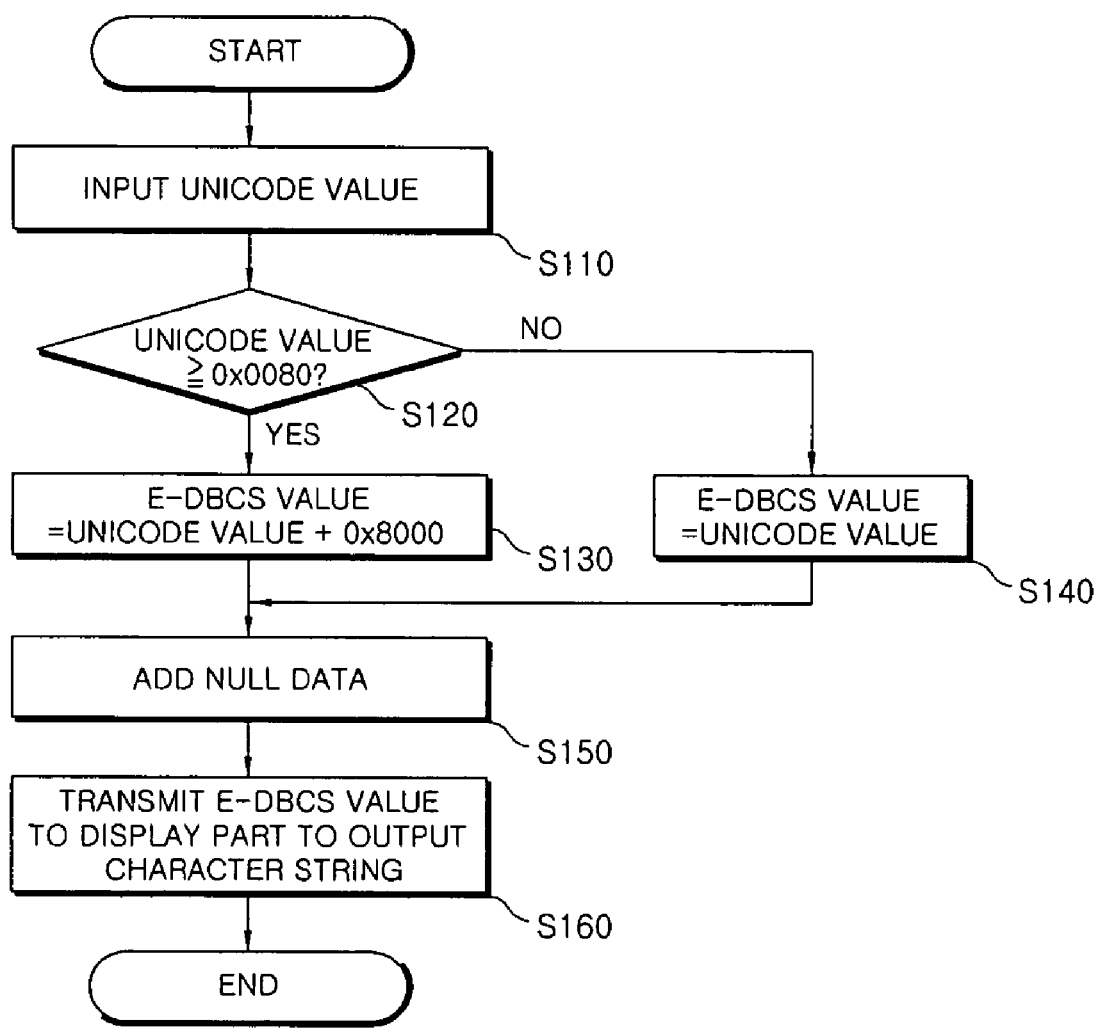
FIG. 1 is a flow chart of a method of generating a character set according to an embodiment of the present invention.

FIG. 1 is a flow chart of a method of generating a character set according to an embodiment of the present invention.

First, a method of encoding a character set will be described in detail. Examples of the character set include a single-byte character set (SBCS), a multi-byte character set (MBCS), and a Unicode character set.

SBCS means a character set using one byte for each character. In this character set, a character string ends with '₩0' to indicate the end of the character string. An example of the SBCS is an ASCII code. FIGS. 2A and 2B illustrate tables for the ASCII code.

MBCS means a character set in which a character such as Hangeul, Japanese or Chinese is encoded in two bytes and a character such as English is encoded in one byte. MBCS is generally referred to as a double-byte character set (DBCS) since there is no character using three or more bytes.

A DBCS encoding method uses a specific value to determine whether a character uses one byte or two bytes. For example, in the Shift-JIS encoding method, values between 0x81 and 0x9F and between 0xE0 and 0xFC represent two-byte characters. These values are referred to as lead bytes and are larger than 0x7F. The lead byte is followed by a trail byte. In DBCS, the trail byte may have a value other than '0'. Similarly to SBCS, a character string ends with '₩0' in DBCS.

Unicode character set means a character set in which every character is encoded in two bytes. Thus, it requires more memory for a character than SBCS. That is, a character uses one, two, or three bytes in MBCS, while every character uses two bytes in the Unicode character set. In the Unicode character set, a character string ends with '₩0₩0'. FIG. 3 illustrates part of Unicode character set. The Unicode character set has a range wider than ASCII range from 0x0000 to 0x00FF.

A method of generating a character set according to an embodiment of the present invention will be described with reference to FIG. 1. In operation S110, a character code is input. The character code may be a Unicode. In operation S120, it is determined whether or not a value of the Unicode is greater than 0x0080. If the Unicode value is greater than 0x0080, the Unicode value is added to 0x0080 to generate an Extended-DBCS (E-DBCS) value in operation S130. Otherwise, the Unicode value is output as an E-DBCS value in operation S140. The E-DBCS value means a new character code value. In operation S150, null data is added to the resultant character code string. The null data uses a byte of '₩0'. In operation S160, the character string having the null data is transmitted to a display part and is output. The E-DBCS value may be converted to a Unicode value by subtracting 0x0080 from the E-DBCS value.

For example, when Unicode values of 0x0400 and 0x0041 are input, 0x0400 is added to 0x8000 and then 0x8400 is output since 0x0400 is larger than 0x0080. Meanwhile, since a Unicode value of 0x0041 is less than 0x0080, it is recognized as an ASCII code and 0x41 is output. As a result, 0x840041 is obtained. 0x00 representing the end of character string is added to 0x840041, resulting in 0x84004100.

Figure 4:
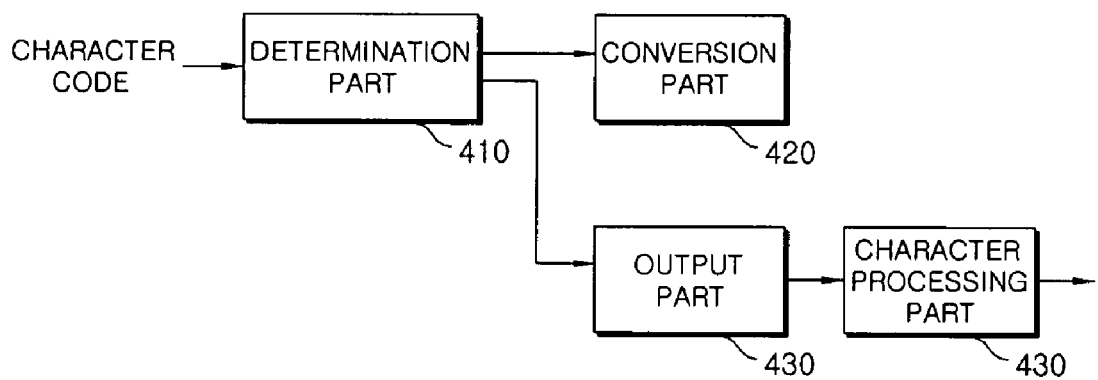
FIG. 4 is a block diagram of an apparatus for generating a character set according to an embodiment of the present invention.

FIG. 4 is a block diagram of an apparatus for generating a character set according to an embodiment of the present invention.

The apparatus for generating a character set includes a determination part 410, a conversion part 420, and an output part 430. The apparatus may further include a character processing part 440 that processes and displays a character string outputted from the output part 430.

The determination part 410 receives a character string. The character string may be a Unicode character set. The determination part 410 determines whether or not a value of a character code is greater than 0x8000. If the character code value is greater than 0x8000, the determination part 410 transmits the character code to the conversion part 420. Otherwise, the determination part 410 transmits the character code to the output part 430. The conversion part 420 adds 0x8000 to the character code value and transmits the resultant value to the output part 430. The output part 430 adds a byte of null data to the transmitted character code, thus generating a character string. The null data may be '00'. The character processing part 440 processes and displays the character string generated in this manner.

Meanwhile, the above-mentioned method of generating a character set may be written in a computer program. Codes and code segments constituting the program can be easily deduced from computer programmers in the art. The program is stored in computer readable media and is executed by a computer, thereby performing the method of generating a character set. Examples of the computer readable media include magnetic recording media, optical recording media, and carrier wave media.

As apparent from the above description, it is possible to improve the processing speed since conversion of a character code is determined using a Unicode value without using a conversion table.

In addition, it is possible to reduce memory required for a character set since the character uses one or two bytes. Further, it is possible to represent special characters supported in the Unicode character set.

While the present invention has been described with reference to exemplary embodiments thereof, it will be understood by those skilled in the art that various changes in form and details may be made therein without departing from the scope of the present invention as defined by the following claims.

What is claimed is:

1. A method of generating a character set, comprising:
    receiving two bytes of a character code value and determining whether or not the character code value is greater than a predetermined reference value;
    adding a predetermined offset value to the character code value and outputting the resultant value if the character code value is greater than the predetermined reference value, and outputting the character code value if the character code value is not greater than the predetermined reference value; and
    adding null data to the end of a character string consisting of the character code value after the character code value is input.

2. The method of claim 1, wherein the character code value is a Unicode value, and the predetermined reference value is '0x0080'.

3. The method of claim 1, wherein the offset value is '0x8000', and the null data is '0x00'.

4. A computer readable medium recording a program executing in a computer the method of claim 1.

5. An apparatus for generating a character set, comprising:
    a determination part receiving two bytes of a character code value and determining whether or not the character code value is greater than a predetermined reference value;
    a conversion part adding a predetermined offset value to the character code value and outputting the resultant value if the character code value is greater than the predetermined reference value; and
    an output part adding null data to the end of a character string consisting of the character code value after the character code value is input and outputting the character string.

6. The apparatus of claim 5, further including a character processing part processing and displaying the character string.

7. The apparatus of claim 5, wherein the character code value is a Unicode value, and the predetermined reference value is '0x0080'.

8. The apparatus of claim 5, wherein the offset value is '0x8000', and the null data is '0x00'.

* * * * *